July 14, 1959 D. C. CAMP ET AL 2,894,717
DOUBLE ACTION AUTOMATIC WATERING VALVE
Filed Dec. 8, 1954 5 Sheets-Sheet 1

INVENTOR:
Dempsie C. Camp,
BY Cushman, Darby & Cushman
ATTORNEYS.

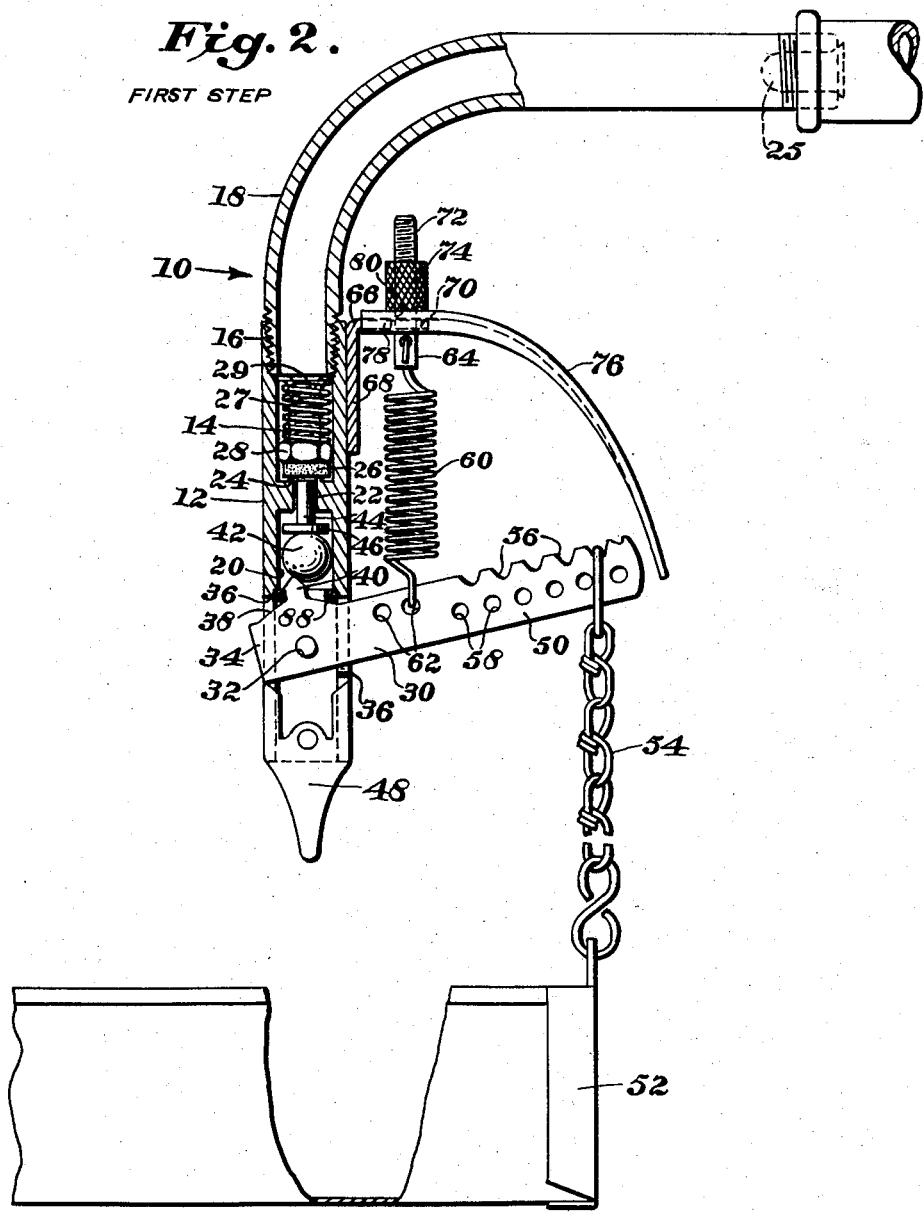

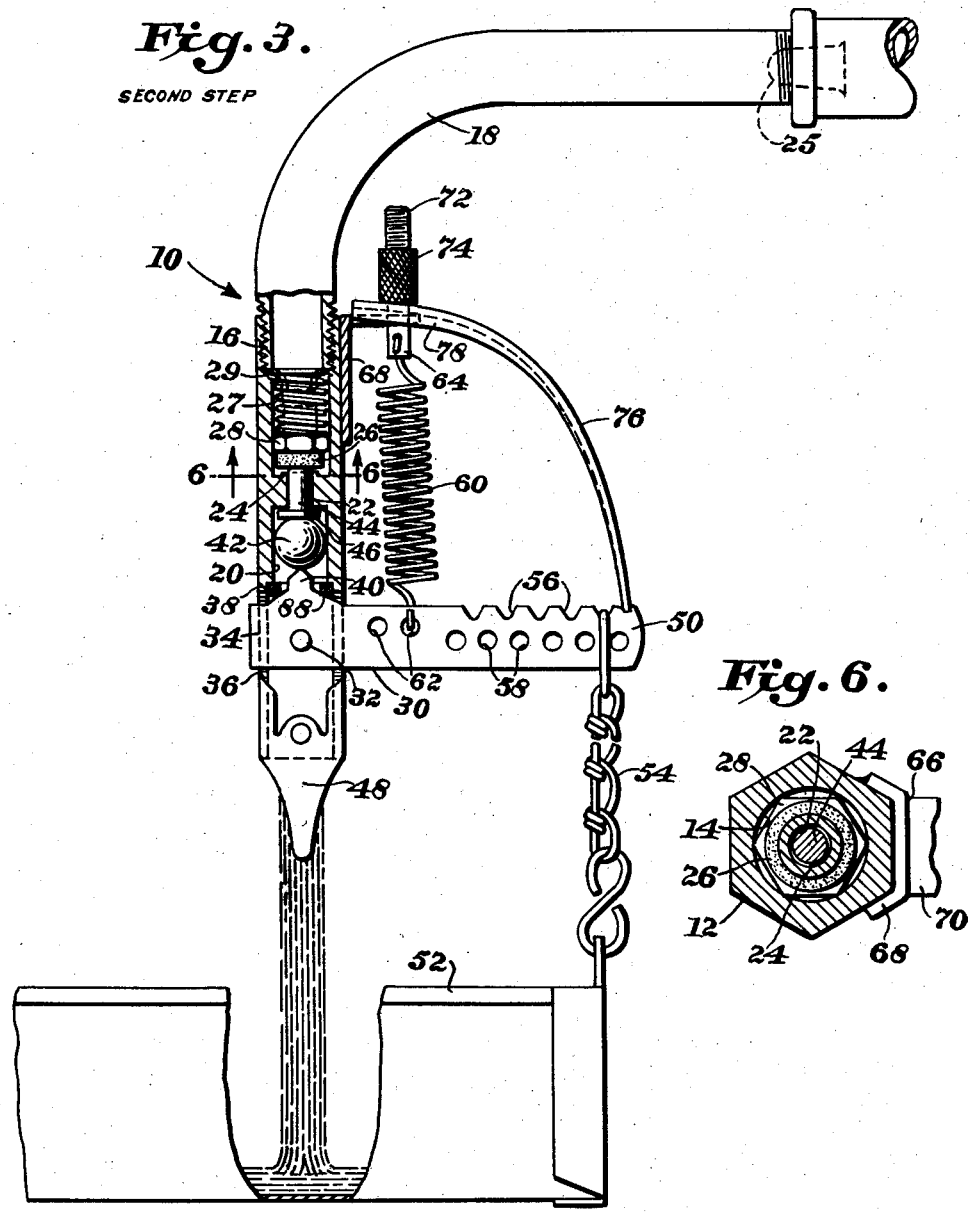
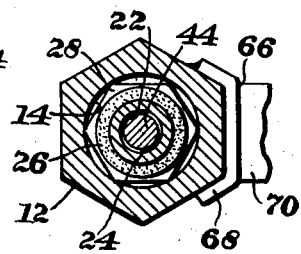

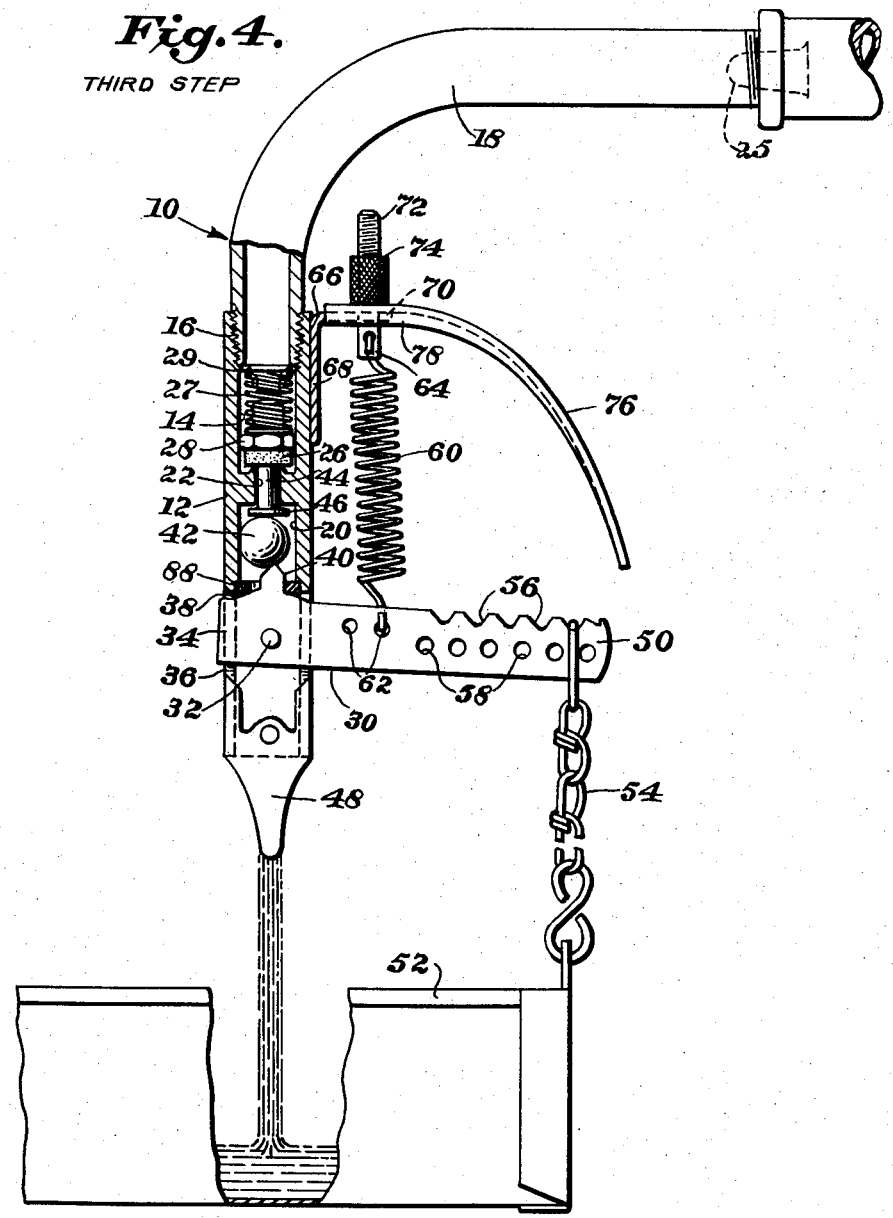

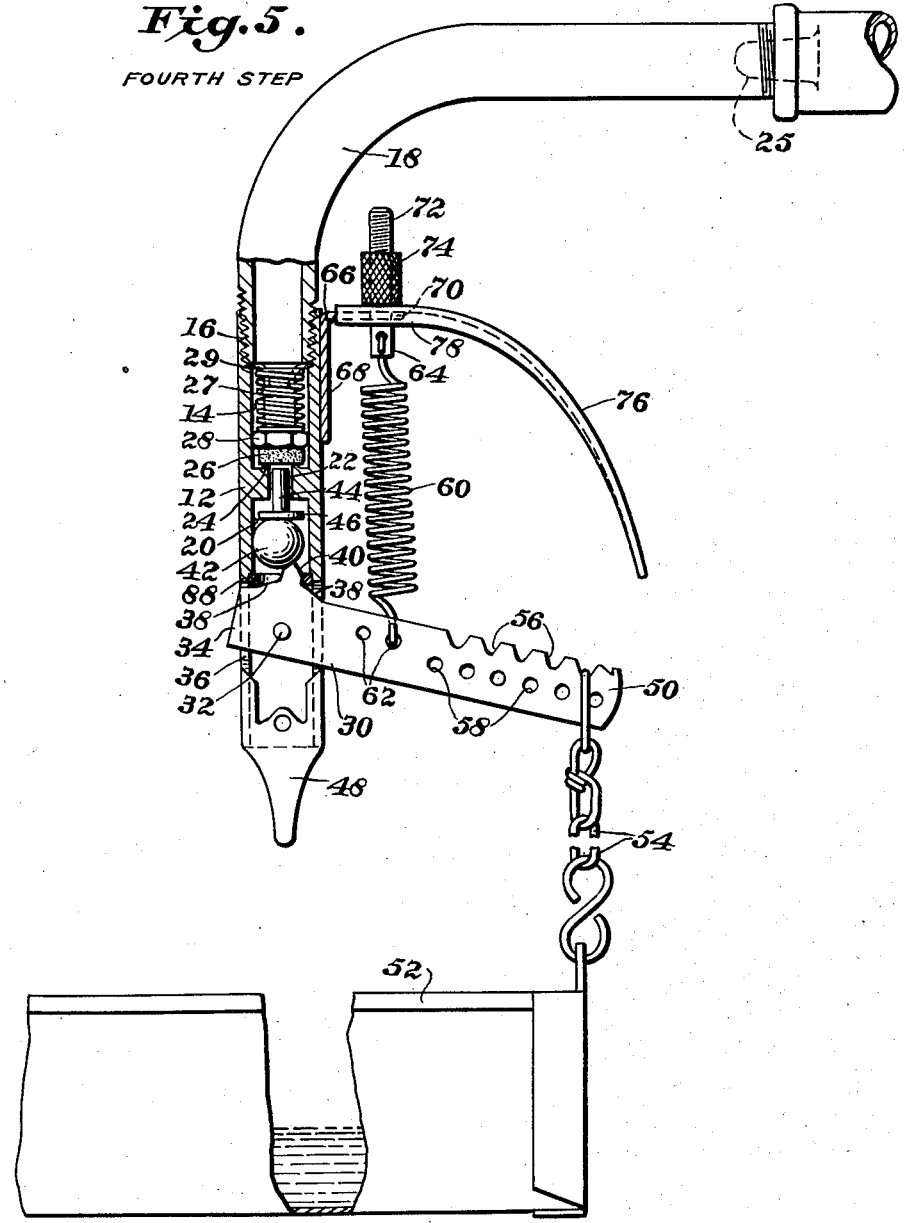

United States Patent Office

2,894,717
Patented July 14, 1959

2,894,717

DOUBLE ACTION AUTOMATIC WATERING VALVE

Dempsie C. Camp, Dunlap, and Charles T. Robinson, Chattanooga, Tenn., assignors to The Cumberland Case Company, Chattanooga, Tenn., a corporation of Tennessee Application December 8, 1954, Serial No. 473,977

9 Claims. (Cl. 251—263)

This application relates to valves and more particularly to automatic valves for maintaining a liquid level in a receptacle operatively associated therewith.

It is an object of the present invention to provide an automatic watering valve suitable for use in maintaining a water level in a receptacle, such as a poultry watering trough, or the like, which comprises a minimum number of movable parts coacting in an improved manner so as to achieve an optimum simplicity of operation.

A further object of the invention is the provision of an automatic watering valve having an improved valve structure which may be easily and economically manufactured and maintained in working order.

Another object of the invention is the provision of an automatic valve having improved starting latch means which may be easily operated to initiate the operation of the valve and is spring urged to move into an inoperative position after initiation of automatic operation.

Still another object of the present invention is the provision of a simple but effective means for seating and unseating the valve member of an automatic valve which enables the flow of water to be quickly started and shut off.

A still further object of the present invention is the provision of an improved valve means which affords a controlled discharge of water so that the same will be received in the associated receptacle without splashing, spilling or the like.

A still further object of the present invention is the provision of an automatic watering valve having a valve member which may be easily replaced when the same becomes worn.

A still further object of the present invention is the provision of an automatic watering valve having an improved valve mechanism which minimizes the wear to which the replaceable valve member is subjected.

These and other objects of the present invention will become more apparent during the course of the following detailed description and the appended claims.

The invention may best be understood with reference to the accompanying drawings wherein illustrative embodiments are shown.

In the drawings:

Figure 2 is an enlarged vertical sectional view of the valve showing the same in its upper empty trough supporting position;

Figure 3 is a view similar to Figure 2 showing the valve in its intermediate flow starting position;

Figure 4 is a view similar to Figure 2 showing the valve in an intermediate position after release of the starting latch;

Figure 5 is a view similar to Figure 2 showing the valve in its lower full trough supporting position;

Figure 6 is an enlarged transverse sectional view taken along the line 6—6 of Figure 3;

Figure 1:
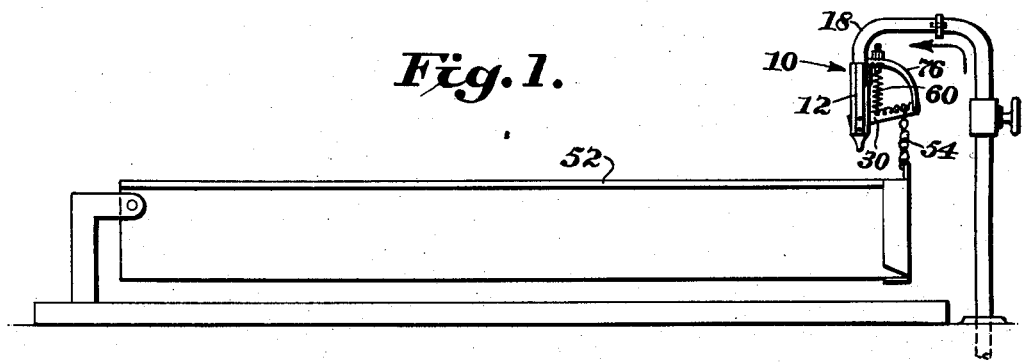
Figure 1 is an elevational view showing an automatic valve embodying the principles of the present invention as used with a poultry watering trough.

Referring now more particularly to the drawings, there is shown in Figures 1–6 a preferred embodiment of an automatic watering valve 10 constructed in accordance with the principles of the present invention. The valve 10 includes a housing 12 which is preferably constructed of a solid bar of metal adapted to be suitably machined into its final form. However, it will be understood that the housing may be formed in other ways, such as by casting or the like, and that other materials may be utilized such as plastic or the like. The upper end portion of the housing bar is formed with an upper bore 14 defining an upper inlet chamber which is threaded as at 16, so as to receive the threaded end of an inlet pipe 18 adapted to communicate with a suitable source of water under pressure. The lower end portion of the housing bar is formed with a lower bore 20 defining a lower discharge chamber and a bore 22 of a lesser diameter is formed between the upper and lower bores to define a port communicating between the two chambers. As shown in the drawings, the bottom wall of the bore 14 is formed so as to provide a valve seat 24 in the form of an annular projection surrounding the bore 22. If desired, a small screen 25 may be disposed within inlet pipe 18 to strain the water passing into the valve.

Mounted within the inlet chamber for movement toward and away from the valve seat 24 is a valve member 26 preferably of disk-shape construction. The bottom surface of the valve member 26 seats on the upper surface of the valve seat 24 so as to shut off the flow of water through the housing. In order to bias the valve member into seating engagement with the valve seat, suitable biasing means, such as coil spring 27, is suitably mounted within the inlet chamber. To this end, a lower stem element 28 has its lower surface in engagement with the valve member 26 and extends upwardly within the spring 27 and an upper hollow stem element 29 has its upper surface in engagement with the lower edge of the inlet pipe 18 and extends downwardly within the spring 27.

Operatively associated with the valve member to control its operation is a control lever 30 pivoted as at 32 to the housing. The lever 30 includes an inner end portion 34 which may extend within the discharge chamber 20 through suitable slots 36 formed in opposite sides of the housing. The inner end portion 34 of the lever is preferably provided with an upper, arcuate surface 38 having a centrally disposed, convex cam surface or projection 40 extending upwardly therefrom. Mounted within the discharge chamber above the lower end portion 34 of the lever is a suitable cam follower preferably in the form of a ball 42 having a diameter less than the diameter of the bore 20. A plunger 44 is mounted for movement within the port 22 and includes an upper end engageable with the valve member 26 and an enlarged lower end 46 engageable with the ball 42. A flow directing member 48 is mounted within the lower end of the discharge chamber 20 between the slots 36 and serves to maintain the flow of water in a relatively compact jet.

The lever 30 also includes an outer end portion 50 which extends outwardly from the housing 12 for supporting therefrom a suitable receptacle, such as a poultry watering trough 52. It is to be understood that while the outer end portion 50 of the lever is shown as supporting a water trough, it may be utilized for other analogous purposes, such as for carrying a float responsive to a water level or the like. The watering trough 52 may be supported at its other end by the lever 30 through a suitable means, such as chains 54 or the like. In order to vary the effective lever arm distance from which the trough is supported on the lever to accommodate various size troughs, a series of V-shaped notches 56 are provided on the upper surface of the lever for selectively receiving the chain 54. If desired, a series of corresponding apertures 58 may be provided for additional selectivity.

Spring means, preferably in the form of a tension coil spring 60, may be connected between the lever and the housing to bias the end portion 50 of the lever into its extreme uppermost position. As shown, the lower end of the spring 60 is selectively connected in one of the series of apertures 62 formed in the lever 30 and the upper end of the spring 60 is connected with a rod 64 carried by a mounting member 66 on the housing. The mounting member 66 may take the form of an L-shaped bracket having a vertical leg 68 rigidly secured to the outer surface of the housing by any suitable means such as welding or the like, and a horizontal leg 70 extending outwardly from the housing and disposed above the end portion 50 of the lever. The horizontal leg 70 of the mounting member is suitably apertured to slidably receive the rod 64, the upper end of which is preferably threaded as at 72 to receive a cooperating member 74 in engagement therewith. The member 74 may have its periphery knurled to provide a frictional surface for turning the same to thereby adjust the tension in the spring 60.

Means are preferably provided for initially maintaining the lever 30 in an intermediate flow starting position. As shown in Figure 3, this means may take the form of an elongated latch member 76 mounted at its upper end portion in overlapping relation with the outer end portion of the horizontal leg 70 of the mounting member 66. The latch member 76 may include a pair of depending flanges 78 which taper inwardly from the upper end of the latch member to the lower end thereof. The flanges adjacent the upper end of the latch member embrace the horizontal leg 70 of the mounting member so as to prevent lateral movement thereof. The rod 64 extends through a suitable aperture 80 in the upper end of the latch member, upon which the member 74 seats. In this manner, the spring 60 biases the upper end of the latch member into engagement with the horizontal leg 70 of the mounting member so that the lower end of the latch member will be normally disposed out of the path of pivotal movement of the end portion 50 of the lever as shown in Figure 4.

Figure 7:
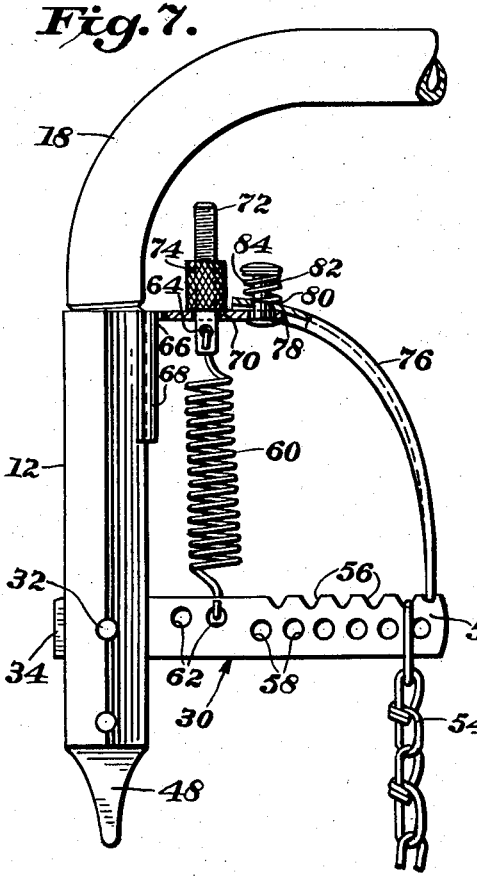
Figure 7 is a fragmentary elevational view of a modified construction for mounting the starting latch.

In Figure 7 there is shown a modified means for resiliently mounting the overlapping ends of the mounting member 66 and the latch member 76. In this embodiment, a rod member 82 having enlarged ends extends through suitable apertures in the horizontal leg 70 of the mounting member and the upper end portion of the latch member 76. An additional spring 84 may be disposed between the upper enlarged end of the rod 82 and the end portion of the lever and serves to bias the end portions of the members into engagement with each other so that the lower end of the latch member will be disposed out of the path of movement of the outer end portion 50 of the lever as heretofore noted.

Figure 8:
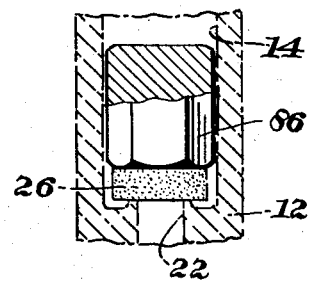
Figure 8 is an enlarged fragmentary sectional view showing a modified construction of the valve member biasing means of the present invention.

In Figure 8 there is shown a modified means for biasing the valve member into seating engagement with the valve seat. As shown, a weight member 86 of hexagonal cross-section may be disposed within the inlet chamber in lieu of the coil spring 27 and associated stem elements 28 and 29. While the weight member 86 gives satisfactory results, it is preferred to utilize the spring 27 since to obtain a comparable seating pressure, the weight member must of necessity be considerably large. It will be understood that since the force of the water on the valve member is small in comparison with that of the spring, there will be ample pressure at all times to provide an effective sealing engagement even when a relatively low water pressure exists. Moreover, when medications are mixed with the water for poultry feeding purposes, a residue often deposits on the valve seat. This or any type of small particle can, if there is not sufficient seating pressure on the valve member, prevents a complete shut off of the flow. With the use of the spring, however, such particles are forced from between the valve member and its seat and a satisfactory seal is always assured.

In operation, the watering valve of the present invention is adapted to automatically maintain a predetermined water level in the receptacle operatively associated therewith. In the embodiment shown, the receptacle takes the form of a poultry watering trough 52 having a free end thereof supported from the outer end portion 50 of the lever through the chain 54. Spring 60 normally biases the lever upwardly wherein the outer end portion 50 of the lever is disposed in its extreme uppermost position.

The knurled member 74 is adjusted to maintain the tension in the spring 60 sufficient to support the dead weight of the empty trough. This empty trough supporting position is shown in Fig. 2, and it will be noted that the cam projection 40 extends at an angle with respect to the ball 42 permitting the latter to move downwardly in the discharge chamber. Likewise, the plunger 44 supported by the ball 42 is permitted to be moved downwardly out of engagement with the valve member 26 so that the latter may seat on the valve seat 24 to shut off the flow of water through the housing.

When it is desired to fill the trough with water, the outer end portion 50 of the lever is moved downwardly against the action of the spring 60 or spring 84 as the case may be, into intermediate flowing starting position, as illustrated in Fig. 3, and the lower end portion of the latch member 76 is moved downwardly against its spring action until the same is in engagement with the outer end portion of the lever. It is to be noted that the outer transverse edge of the horizontal leg 70 of the mounting member provides a fulcrum about which the latch member moves. As the lever 30 is moved into its intermediate flow starting position, cam projection 40 is moving upwardly and carries with it the ball 42 and plunger 44. As the plunger 44 is moved upwardly, the upper end thereof will engage the lower surface of the valve member to move the same away from the valve seat 24 thereby permitting water to flow through the housing into the trough.

In this regard, it is well to note the improved flow characteristics provided by the construction of the present invention. The stem element 28 or the weight member 86 as the case may be, are preferably of hexagonal cross-section so that the water flowing from the source through the pipe 18 may flow between the outer surfaces thereof and the inner surface of the chamber 14. The plunger member 44 is of a diameter less than the diameter of the port 22 so that the water in the inlet chamber will pass downwardly therethrough into engagement with the enlarged lower end portion 46 thereof. As the water strikes the enlarged portion of the plunger, it is deflected upwardly and outwardly against the upper surface of the discharge chamber creating a turbulence which will prevent any direct high velocity water from passing around the ball and out of the discharge chamber. In this regard, a ring-shaped gasket or washer 88 may be mounted within the discharge chamber so that the same will engage the arcuate surface 38 on the lever and prevent any water from being deflected outwardly through the slots 36. The water will then flow past the inner end portion of the lever and outwardly through the lower end of the discharge chamber 20. Because of the construction of the elements within the housing, the water stream flow is greatly improved in that it comes from the valve with less spraying, less force and more of a foaming action. The improved water stream flow helps prevent splashing as the water fills the trough and also helps prevent spray from going beyond the trough as the water travels from the valve to the trough.

As set forth above, the water from the source will flow into the trough when the lower end of the latch member is engaged with the outer end portion of the lever as shown in Figure 3. As the water trough fills, the combined weight thereof will cause the spring 60 to extend so that the outer end portion of the lever is moved downwardly. When enough water has been introduced into the trough to effect a lowering of the lever, against the action of the spring 60, sufficient to disengage the lower end of the latch member therefrom, the latter will be spring urged into its normal position out of the path of movement of the outer end portion of the lever, as shown in Figure 4. When the water in the trough has reached its predetermined level, as determined by the setting of the threaded member 74, and/or the position of the chain 54 and spring 60 with respect to the lever, the outer end portion of the lever will be disposed in its extreme lower position. This filled trough supporting position is shown in Figure 5 and it will be noted that the cam projection 40 extends angularly in the opposite direction from its disposition in the empty trough supporting position so that the ball 42 and plunger 44 are again permitted to move downwardly. Likewise, the upper end of the plunger 44 will move out of engagement with the valve member 26 and the latter will seat on the valve seat 24 to shut off the flow of water.

As the water in the trough is consumed and/or evaporates, the tension in the spring 60 will overcome the weight of the water and trough so as to move the outer end portion of the lever upwardly and cam projection 40 will again operate to move the ball and plunger upwardly so as to disengage the valve member from its valve seat. The water may then flow through the housing into the trough until its weight again moves the control lever into its filled trough supporting position. In this manner, a constant water level is automatically maintained in the trough by the operation of the valve.

Figure 9:
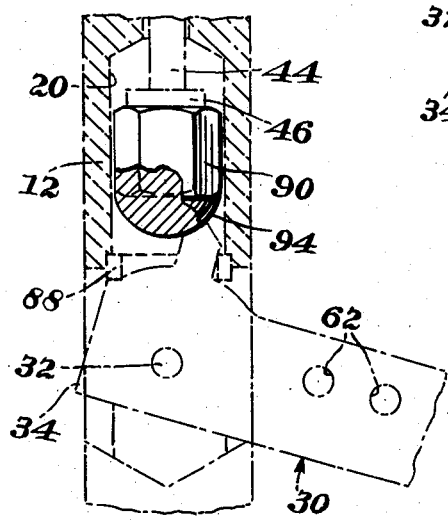
Figure 9 is an enlarged fragmentary sectional view showing a modified form of cam follower for the valve.

In Figure 9 a modified form of the cam follower is shown wherein the ball 42 may be replaced by a member 90 having an upper portion of hexagonal cross-section and a lower cam projection engaging portion 94 of substantially hemispherical shape.

One salient feature of the present construction resides in the cooperative relation between the cam projection and cam follower. It will be appreciated that the ball 42 is of a simple conventional construction and hence, requires no expensive procedures to produce. The cam projection 40 includes two angularly converging surfaces which engage the ball. It is important to note that ball 42 will move downwardly much more rapidly in relation to the movement of the cam projection as the cam projection continues to travel toward the end of the arc. It should also be noted that rapid movement of the ball will also occur when the cam projection is travelling towards the extreme end of its arc in the opposite direction. This rapid movement of ball is a very important and desirable feature since it results in a quick action control of the water flow. This quick action control allows speedier and more accurate adjustment of any desired water level in the trough. While the ball is a preferred construction, it will be understood that the same action will be obtained with the use of the rounded member 90 disclosed in Figure 9.

The automatic watering valve of the invention provides many safety features which are of material advantage when used in poultry farming. It will be readily understood that if for some reason the trough should be upset so that it could no longer hold water, but still would be supported by the outer end portion of the lever, the valve will be automatically shut off since the spring 60 is sufficiently strong to overcome the dead weight of the empty water trough and shut off flow. This feature is of great importance, since if the watering valve were permitted to remain in operation, the poultry house would soon be flooded, thereby causing severe damage. With the use of the present invention, whenever it is necessary to empty the trough as for cleaning or the like, the poultry farmer may conveniently detach the trough by unhooking the chain. When it is desired to fill the trough after it has been cleaned and replaced on the valve, it is necessary only to actuate the latch member 76 into the position shown in Figure 3 to initiate the operation. Thereafter the trough will fill to the level as determined by the adjustment the valve had before removing the trough, and automatic operation will be maintained without the need of constant inspection.

Another salient feature of the present invention resides in the provision of an improved means for prolonging the life of the valve member. With the present construction, the valve member seats against its valve seat with only the weight of the valve member itself, the force of the water pressure, and the weight of the member 86 or the force of spring 27, as the case may be, acting upon it. It will be understood that these forces will be considerably less than the forces acting to move the outer end portion of the lever arm downwardly. In other words, the present arrangement will cause less wear on the valve member than if the valve member were made to seat upwardly against a valve seat by the downward movement of the lever. With the latter arrangement, the entire resultant weight of the water and trough acting through an increasing lever arm is transmitted to the valve member to urge the same into seating engagement. Moreover, with the present arrangement there are no outside forces which could increase the seating pressure acting on the valve member as is the case where the valve seats upwardly by a direct mechanical action. For example, birds attempting to roost on the trough would provide an outside weight in the latter case which would be directly transmitted to the valve member.

Another salient feature of the present invention is the relative ease and simplicity with which the valve member may be replaced when the same becomes worn. To replace a worn valve member, it is merely necessary to disengage the housing from the pipe 18 by unscrewing the same. The valve housing and its associated structure may then be turned upside down so as to permit the stem elements and spring 27 or the weight member 86 as the case may be, together with the valve member 26 to fall out of the inlet chamber 14. In this regard, it is well to note that the enlarged lower end portion 46 of the plunger 44 is of a diameter greater than the diameter of the port 22 and hence, will prevent the plunger from falling out of its position in the port when the housing is turned upside down. Furthermore, since the valve member is not subjected to excessively high mechanical pressures which would tend to distort the entire member, it is possible to turn the valve member over and utilize the other surface thereof as a sealing surface. An inverted or new valve member may be easily inserted in the housing, the biasing means placed thereon and the housing then reengaged on the pipe 18 to effect reassembly.

It is also to be understood that the forms of the invention herewith shown and described are to be taken as the preferred embodiments of the same and that various changes may be made without departing from the spirit of the invention or the scope of the appended claims.

I claim:

1. A valve mechanism comprising a housing defining an upper inlet chamber, a lower discharge chamber and an intermediate port connecting said chambers, said port and chambers being axially aligned, a valve member mounted in said inlet chamber adjacent said port, means in said inlet chamber biasing said valve member toward said port, a plunger mounted for movement within said port, said plunger having an upper end for engagement with said valve member and a lower end portion disposed within said discharge chamber, a cam follower mounted within said discharge chamber adjacent said plunger lower end portion, a control lever pivoted to said housing having one end portion thereof extending within said discharge chamber through slot means formed therein below said cam follower, said lever including an arcuate surface having a convex cam projection extending upwardly therefrom, said cam follower presenting a curved convex surface engaging said cam projection, gasket means adjacent said slot means for engaging said arcuate surface and means biasing said lever into a first extreme position wherein said cam projection is operable to permit said valve member to close said port, said lever being movable into an intermediate position wherein said cam projection is operable to move said cam follower, plunger and valve member upwardly to open said port and a second extreme position wherein said cam projection is operable to permit said valve member to close said port.

2. A valve mechanism as defined in claim 1 wherein said valve member biasing means comprises a coil spring.

3. A valve mechanism as defined in claim 1 wherein said valve member biasing means comprises a weight member.

4. A valve mechanism as defined in claim 1 wherein said cam follower comprises a ball.

5. A valve mechanism as defined in claim 1 wherein said cam follower comprises a member hexagonal in cross-section having a substantially hemispherical lower end.

6. A valve mechanism as defined in claim 1 including a flow directing member mounted on the lower end of said housing within said slot means.

7. A valve mechanism comprising a housing defining an upper inlet chamber, a lower discharge chamber, an intermediate port connecting said chambers in axial alignment therewith, and a valve seat in said inlet chamber surrounding the upper end of said port, a valve member mounted in said inlet chamber adjacent said seat, a plunger mounted for movement within said port having its upper end operatively connected with said valve member, a control lever mounted on said housing for movement between opposed flow preventing positions and an intermediate maximum flow permitting position, and cam means between said lever and said plunger within said discharge chamber for causing said valve member to move into engagement with said seat to close said port in response to the movement of said lever into either of said flow preventing positions and to move out of engagement with said seat to open said port in response to the movement of said lever out of said flow preventing positions toward said intermediate maximum flow permitting position.

8. A valve mechanism of the character described in claim 7 wherein said cam means comprises a convex cam surface on said lever and a ball mounted within said discharge chamber between said cam surface and the lower end of said plunger.

9. A valve mechanism of the character described in claim 7 wherein said plunger is separate from said valve member and includes an enlarged lower end disposed within said discharge chamber.

References Cited in the file of this patent
UNITED STATES PATENTS

| | | |
|---|---|---|
| Re. 23,447 | Pruitt | Dec. 25, 1951 |
| 2,629,396 | Toadvine | Feb. 24, 1953 |
| 2,634,755 | Hobbs | Apr. 14, 1953 |